United States Patent [19]

Prince

[11] 4,378,669
[45] Apr. 5, 1983

[54] PULL TYPE AUTOMATIC TOBACCO HARVESTER AND METHOD OF HARVESTING TOBACCO

[75] Inventor: Arvin W. Prince, Whiteville, N.C.

[73] Assignee: Harrington Manufacturing Company, Lewiston, N.C.

[21] Appl. No.: 285,357

[22] Filed: Jul. 20, 1981

Related U.S. Application Data

[60] Continuation of Ser. No. 884,181, Mar. 7, 1978, abandoned, which is a division of Ser. No. 701,791, Jul. 1, 1976, Pat. No. 4,332,128.

[51] Int. Cl.$^3$ ............................................. A01D 45/16
[52] U.S. Cl. ................................. 56/27.5; 56/DIG. 2
[58] Field of Search ...................... 56/1, DIG. 2, 27.5, 56/218, 228

[56] References Cited

U.S. PATENT DOCUMENTS

| | | | |
|---|---|---|---|
| 3,868,811 | 3/1975 | Cicci | 56/1 |
| 3,893,283 | 7/1975 | Dandl | 56/228 |
| 3,962,850 | 6/1976 | Moore | 56/27.5 |

Primary Examiner—Jay N. Eskovitz
Attorney, Agent, or Firm—Mills and Coats

[57] ABSTRACT

The present invention relates to a pull type multi-pass automatic tobacco harvester adapted to be connected to a farm tractor and pulled through a tobacco field for harvesting tobacco within the field. The pull type automatic tobacco harvester includes a main frame that supports a leaf defoliator assembly and a conveying system on each side thereof for receiving the defoliated tobacco leaves and conveying them to an area of collection. Connecting the harvester to said tractor is a hydraulically actuate swingable tongue that is pivotably mounted about the front portion of said harvester's main frame. When pivotably connected to a draw bar on the tractor, said tongue may be pivoted such that the trailing position of the harvester can be laterally varied relative to the tractor such that the defoliator assembly of said harvester can be properly aligned with any one of two adjacent tobacco rows that run along one side of the tractor. To improve the row tracking capability of the pull type harvester of the present invention, the defoliator assembly is pivotably mounted about a longitudinal axis on said main frame and pivotable laterally back and forth about this longitudinal axis. This allows the row passing area defined within the defoliator assembly to shift laterally with the row being harvested due to variances in row spacing, crooks and curves in the row, and the imprecise positioning of the harvester about the row being harvested.

8 Claims, 8 Drawing Figures

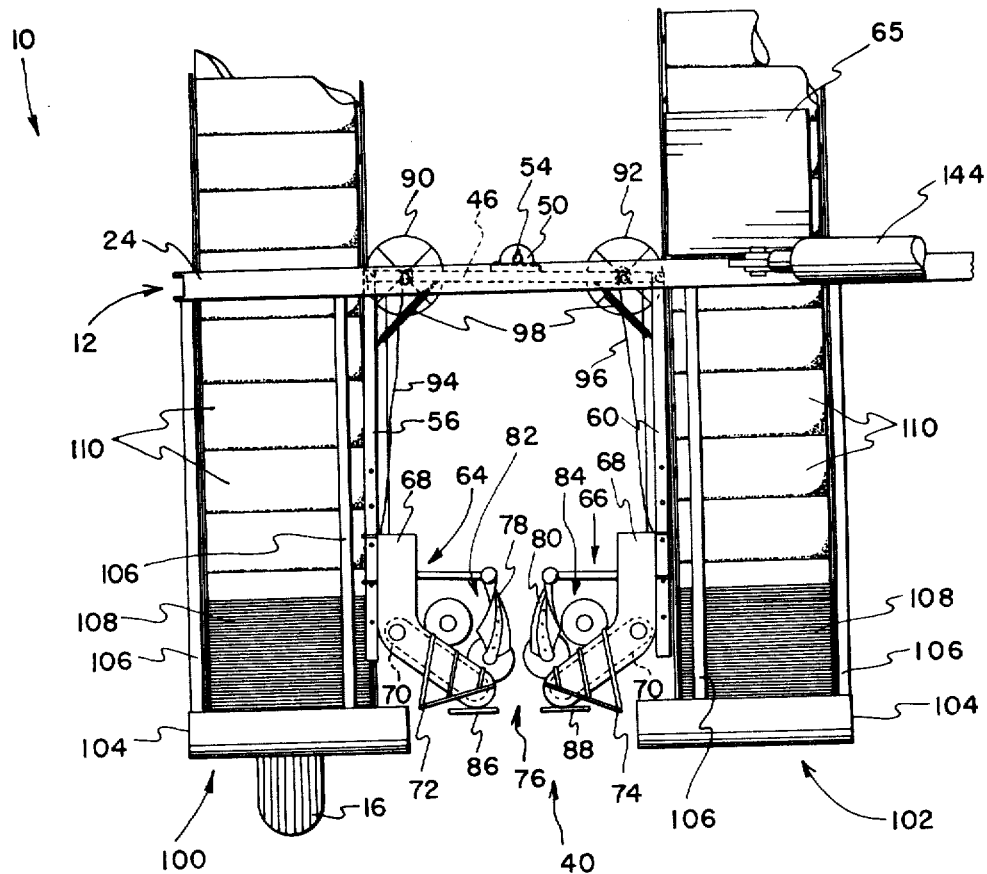
FIG. 3
FIG. 4
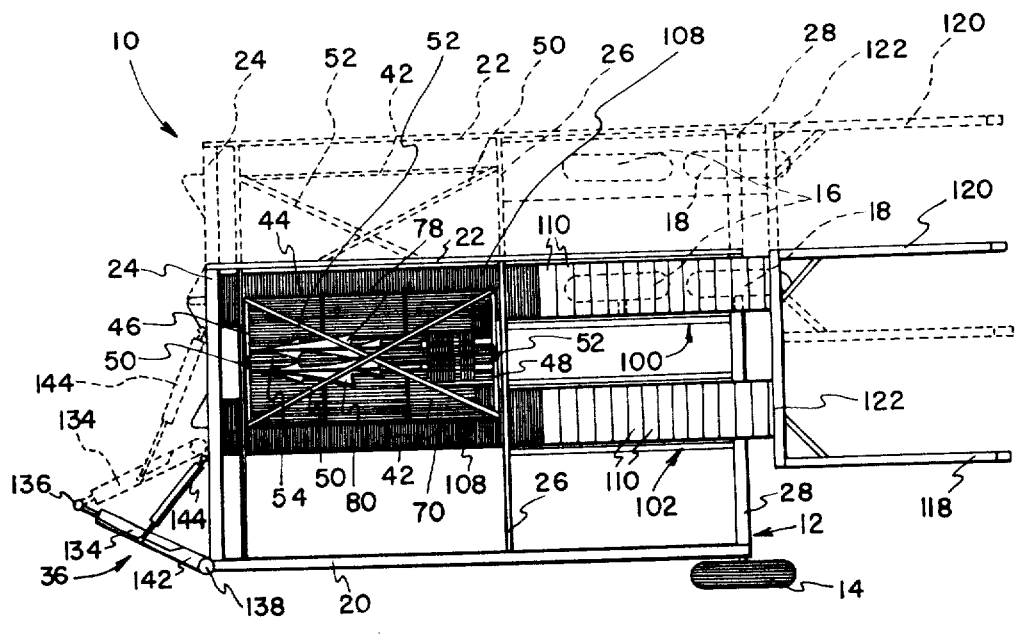

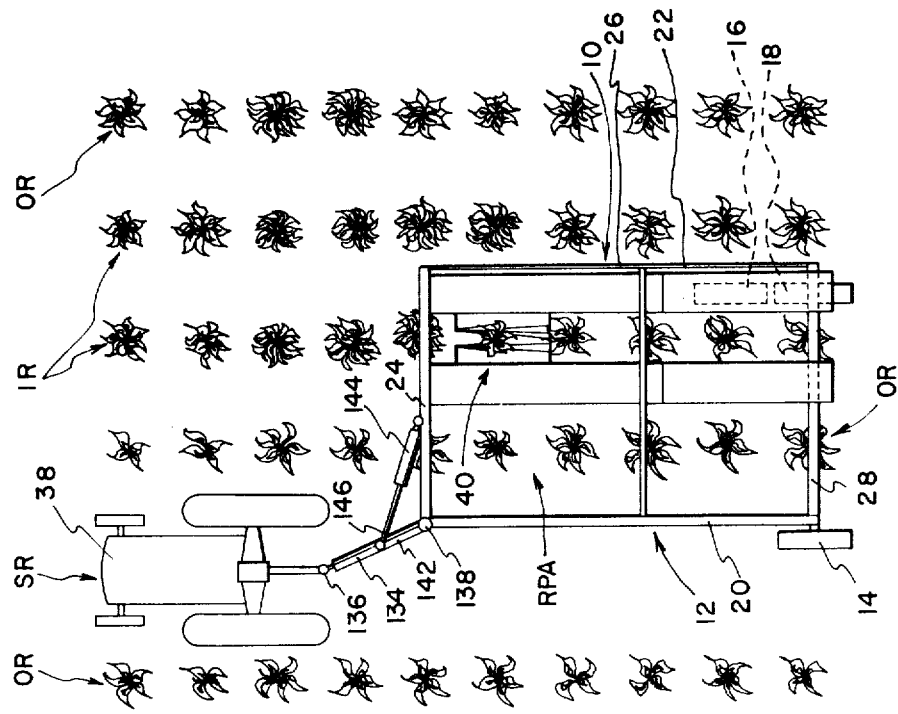
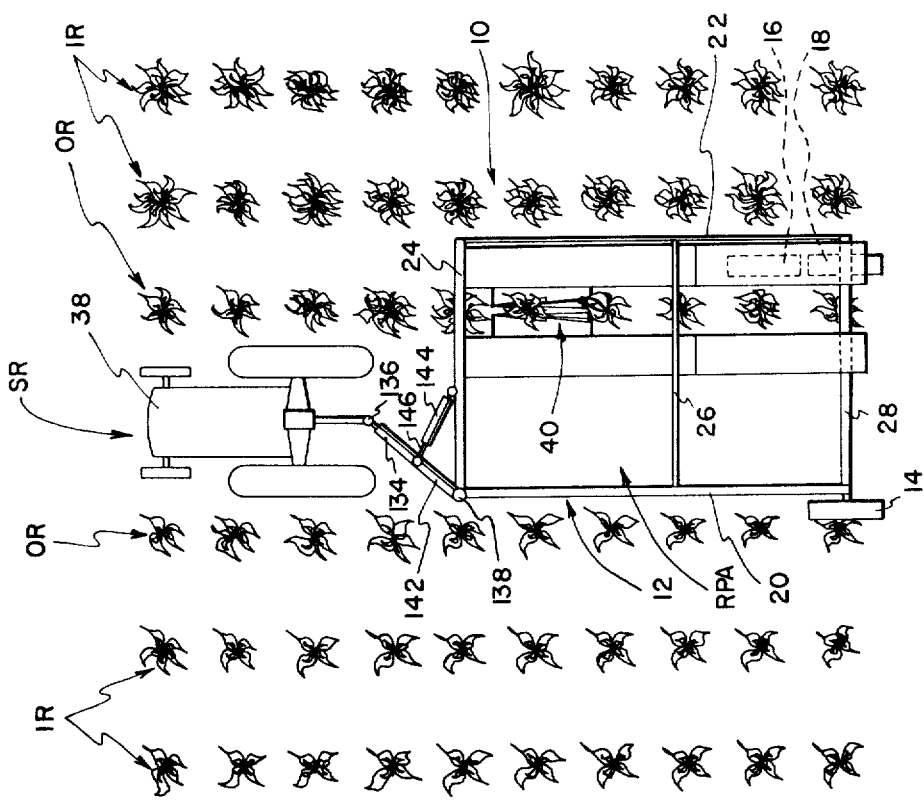

PULL TYPE AUTOMATIC TOBACCO HARVESTER AND METHOD OF HARVESTING TOBACCO

This is a continuation of application Ser. No. 884,181, filed Mar. 7, 1978 now abandoned, said Application Ser. No. 884,181 being a divisional application of U.S. Patent Appl. Ser. No. 701,791, filed July 1, 1976, now U.S. Pat. No. 4,332,128.

The present invention relates to agricultural harvesting machinery, and more particularly to an automatic tobacco harvester of the draft or pull type which is adapted to be pulled through the field during harvesting by a prime mover such as a conventional farm tractor.

BACKGROUND OF THE INVENTION

Increases in tobacco mechanization over the past four years have been quite dramatic as tobacco farmers, especially in the south and flue-cured regions, have purchased automatic tobacco primers and bulk tobacco barns for use in their tobacco farming operations. Most fully automatic tobacco harvesters presently in use are of the high clearance self-propelled type such as shown in U.S. Pat. No. 3,841,071, and such as the high clearance self-propelled "Roanoke" tobacco harvester manufactured by Harrington Manufacturing Company of Lewiston, North Carolina. These self-propelled automatic tobacco harvesters are available in both one and two-row models. Certainly the "Roanoke" self-propelled harvester has met with great commercial success and acceptance by tobacco farmers. However, some farmers with small and moderate tobacco acreages, such as a farmer with 10 to 20 acres, have found it difficult to justify the investment required for a high clearance self-propelled tobacco harvester in terms of the expected return and profit from such small tobacco acreages. Still the small tobacco farmer faces the same labor scarcity as large tobacco farmers, and these small tobacco farmers desire to continue a tobacco farming operation. Thus, the need still exists for the small tobacco farmer to mechanize, but at a reasonable investment in terms of crop size and expected returns from their tobacco crop.

There has been some attempt to provide the smaller tobacco farmers with an automatic tobacco harvester at a price significantly below the cost of a conventional high clearance self-propelled automatic tobacco harvester. Because almost all tobacco farmers have at least one conventional farm tractor for other farm use, it has been attractive to explore the possibility of a tractor mounted harvester or a pull type harvester, in either case the power being provided by the conventional farm tractor to move the harvester through the field and to drive the various working components thereof such as defoliators and conveyors forming a part of the harvester.

Tractor mounted harvesters have just recently been introduced to tobacco farmers, these tobacco harvesters being of the general type manufactured by Lebro Manufacturing, Inc., Waycross, Georgia, and referred to as the G S & H Tractor Mounted Harvester. Generally, tractor mounted tobacco harvesters involved heavy and cumbersome frame work that requires substantial time and effort to mount and dismount the same about the tractor. In addition, such harvesters normally are provided with a rear cross conveyor for conveying the defoliated leaves from the harvester into a trailer being pulled by the same tractor in which the harvester is mounted. Often it becomes difficult to turn and maneuver both the tractor and trailing trailer with the harvester mounted on the tractor. But perhaps the most significant problem faced by the tractor mounted harvester is in being able to harvest at least two rows on one side of the tractor middle or skip row provided in the tobacco field for the tractor to pass. This is because many tobacco farmers find it desirable and advantageous to skip every fifth row in a tobacco field during the planting operation, so as to leave the fifth row open for the tractor to pass therethrough during particular harvesting operations. This has become an almost universally accepted cultural practice where a farm tractor is used in harvesting. In multi-pass harvesting where it is required that the harvester pass along each row several times during the tobacco harvesting season, it becomes important for the tractor mounted harvester to have the capability to reach an inside row or the row outwardly of the outside row that runs adjacent the fifth row or tractor path. This is being done by providing a transverse frame as a part of the tobacco harvester wherein the entire defoliator assembly and associated conveyors are moved laterally back and forth from a first position where the defoliator assembly aligns with the outside row to an extended position where the same defoliator assembly aligns with the inside row. It is very difficult to shift the defoliator assembly back and forth with respect to the tractor in order to accommodate both outside and inside rows. In addition, when the defoliator assembly is extended to a position for harvesting the inside row, often the weight of the defoliator assembly in this extended position disturbs the balance of the tractor and the harvester mounted thereon. To compensate for this some means for counter balancing the entire tractor and harvester structure is provided for, although rarely is such counter balancing completely effective.

It should be pointed out that one alternative to the problem discussed above with respect to requiring the defoliator assembly itself to be shifted relative to the harvester's main frame to accommodate outside and inside rows, is that the farmer could skip every third row in the tobacco field and consequently there would be only one row on each side of the skip row to be harvested, and this would not require shifting the defoliator assembly as the two outside rows could be harvested by passing the tractor through the skip row twice, once in each direction. But this is not an attractive alternative, because greater land area is required for a given quantity of tobacco, and many farmers today do not have the necessary suitable land for this type of planting. In addition, in either case with the tractor mounted tobacco harvester, the transverse width of the tractor and harvester as combined is substantially greater than the width of the tractor and generally a wider skip row is required for the tractor mounted harvester to pass. This creates inconvenience in planting and cultivating the tobacco crop, and often a non-standard row spacing is required.

Finally reference is made to U.S. Pat. No. 3,962,850 which generally discloses a trail type tobacco harvester adapted to be connected to and pulled through the field by a tractor. Again many of the problems associated with the conventional tractor mounted tobacco harvester is present here. Principally, this type of trail harvester is again provided with a defoliator assembly that requires lateral shifting independently of the harvester's main frame to accommodate either of two rows disposed on one side of the skip row or tractor passing middle formed within the field. Also, where the pull type harvester is provided with a cross conveyor, and a trailer pulled by the tractor receives tobacco from the cross conveyor, the combined harvester and trailer structural network connected to the tractor makes the entire network, i.e., tractor, harvester, and trailer, very difficult to turn, handle, and maneuvers, especially at the ends of the rows where the tractor, harvester, and trailer must be turned in order to enter the field for harvesting another row.

SUMMARY OF THE INVENTION

The present invention relates to a trail or pull type automatic tobacco harvester which is of a relatively low cost as compared to conventional high clearance self-propelled automatic tobacco harvesters, and which is designed to overcome the problems and disadvantages of tractor mounted and pull type tobacco harvesters referred to above.

The pull type automatic tobacco harvester of the present invention is adapted to be towed or pulled by a conventional farm tractor, and includes a main frame that is wheel supported and has a hydraulic actuated swingable tongue that connects to a draw bar of a conventional farm tractor. By selectively actuating a hydraulic cylinder operatively interconnected between said tongue and the main frame of the harvester, the trailing position of the harvester and main frame thereof can be laterally adjusted with respect to the tractor such that a defoliator assembly carried by the harvester's main frame may properly align with either of two rows on one side of the tractor which in the harvesting operation occupies a position within a tractor row, commonly referred to as a skip row in the tobacco field. It should be pointed out that in a conventional tobacco row planting scheme, that the tractor passing middle or row (or skip row) is every fifth row. Essentially, tobacco is not planted in the skip row, and this permits a tractor to pass through the field for spraying, harvesting, or performing other field operations. Thus, it is appreciated that on each side of a tractor passing row or skip row is four rows of tobacco, the rows being layed out in side-by-side relationship. By driving the tractor through the field along one skip row and returning through the field in the same skip row, it is appreciated that the two rows on each side of the skip row can be harvested by the pull type automatic tobacco harvester of the present invention.

In addition, to compensate for variations in row spacing, abrupt curves in the tobacco stalk rows, misaligned stalks and other irregularly lined stalks, and misalignment of the harvester with respect to the row being harvested caused by deviations of the tractor or simply the failure to properly position the harvester with respect to the row being harvested, the pull type tobacco harvester of the present invention is provided with a defoliator assembly swingably mounted about a longitudinal axis on the main frame of the harvester. If for any of the above reasons or any other reason, the defoliator assembly in its normal downwardly depending position does not exactly line with the row being harvested, then the defoliator assembly can swing about the longitudinal axis laterally back and forth as the tobacco stalks pass therethrough during the harvesting operation. This permits the pull harvester of the present invention to efficiently and effectively harvest tobacco from a row even where there is some misalignment between the row being harvested and the row opening defined within the defoliator assembly when disposed in its normal downwardly depending position.

It is, therefore, an object of the present invention to provide an effective and efficient automatic pull type tobacco harvester that can be propelled during the tobacco harvesting operation by a conventional farm tractor so as to provide an automatic tobacco harvester of a cost lower than the cost of a conventional high clearance self-propelled automatic tobacco harvester.

Another object of the present invention is to provide an automatic tobacco harvester of the trail or pull type which can be fully powered and propelled by a conventional farm tractor and which is particularly suited for the small and medium-size tobacco farmer.

A further object of the present invention resides in the provision of a tractor drawn trail or pull type automatic tobacco harvester that may be laterally adjusted relative to the tractor pulling the harvester in order to align with and harvest either of two laterally spaced tobacco rows that run adjacent one side of a tractor passing row or skip row in the tobacco field.

Still a further object of the present invention is to provide a pull type automatic tobacco harvester that exhibits superior row tracking capabilities during the harvesting operation.

A more specific object of the present invention is to provide a pull type automatic tobacco harvester wherein the same is provided with a defoliator assembly movably mounted about the main frame of said harvester such that the entire defoliator assembly is movable generally laterally back and forth with respect to the harvester such that the tracking capability of the harvester is enhanced where conditions of misalignment between the defoliator assembly and the row being harvested exist.

Another object of the present invention is to provide a pull type automatic tobacco harvester of the general multi-pass type, wherein the harvester is particularly adapted to be compatible with the tobacco planting practice of skipping every fifth row in the planting operation so as to give rise to a field wherein every fifth row is vacant in order to accommodate a conventional farm tractor, and wherein said harvester is specifically adapted to move laterally relative to a tractor in order that the same may align with and harvest either an outside row adjacent the skip row normally occupied by the tractor during the harvesting operation, or an inside row which is spaced inwardly of said outside row on the side thereof opposite the skip row.

A further object of the present invention is to provide a pull type automatic tobacco harvester compatible with a fifth row skipping planting scheme for tobacco that is capable of harvesting both outside and inside rows (one at a time) on each side of respective skip rows without requiring the defoliator assembly of the harvester to be shifted laterally back and forth the distance of one row spacing with respect to the main frame of the harvester.

Still a further object of the present invention is to provide a pull type automatic tobacco harvester capable of aligning with and harvesting both outside and inside rows in a field employing the fifth row skipping scheme referred to above, wherein the trailing position of the pull type harvester can be laterally varied with respect to the tractor connected to, so as to align with and harvest either the outside or inside rows that run adjacent respective sides of the skip row that is generally occupied by the tractor pulling the harvester during the harvesting operation.

Still a further object of the present invention is to provide a pull type automatic tobacco harvester of the type referred to above, wherein the same is provided with control means for varying the trailing position of the harvester with respect to a front connected tractor such that an operator can steer and control the harvester at any time during the harvesting operation such that the defoliator assembly can be more closely maintained in alignment with the row being harvested.

Another object of the present invention is to provide an automatic tobacco harvester with an improved hydraulic fork lift assembly about the rear thereof for supporting leaf collecting means in an elevated position.

Other objects and advantages of the present invention will become apparent from a study of the following description and the accompanying drawings which are merely illustrative of the present invention.

BRIEF DESCRIPTION OF THE DRAWINGS

FIG. 3 is a fragmentary front elevational view of the pull type automatic tobacco harvester.

FIG. 4 is a top plan view of the pull type automatic tobacco harvester of the present invention illustrating lateral adjustment of the harvester with one position shown in full lines and a second position shown in dotted lines.

FIG. 7 is a schematic illustration of the pull type automatic tobacco harvester of the present invention disposed in a first position for harvesting a first outside row.

FIG. 8 is a schematic illustration of the pull type automatic tobacco harvester of the present invention disposed in a second position for harvesting a second row, referred to as an inside row.

PULL TYPE AUTOMATIC TOBACCO HARVESTER

In the following description, right-hand and left-hand references are determined by standing at the rear of the pull type automatic tobacco harvester and facing the direction of travel when the harvester is utilized in a tobacco harvesting operation.

Figure 1:
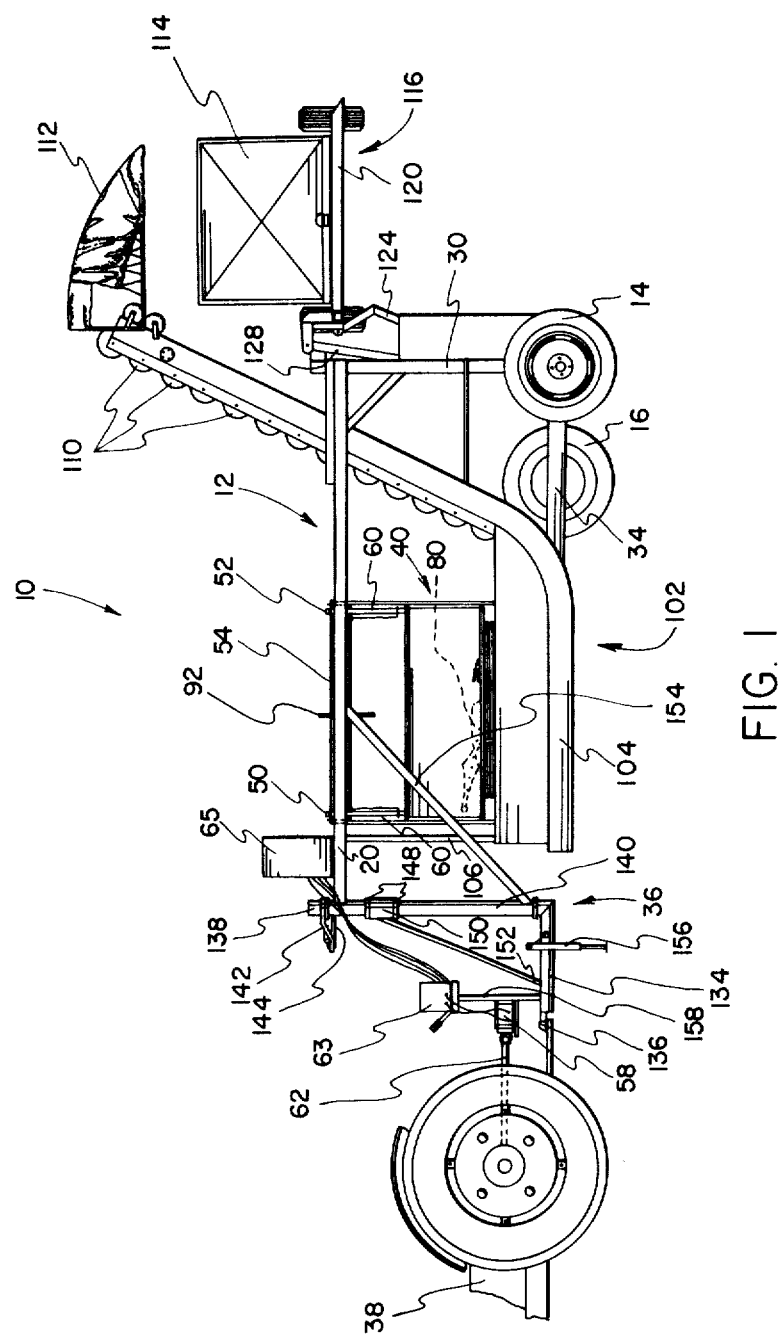
FIG. 1 is a side elevational view of the pull type automatic tobacco harvester of the present invention
Figure 2:
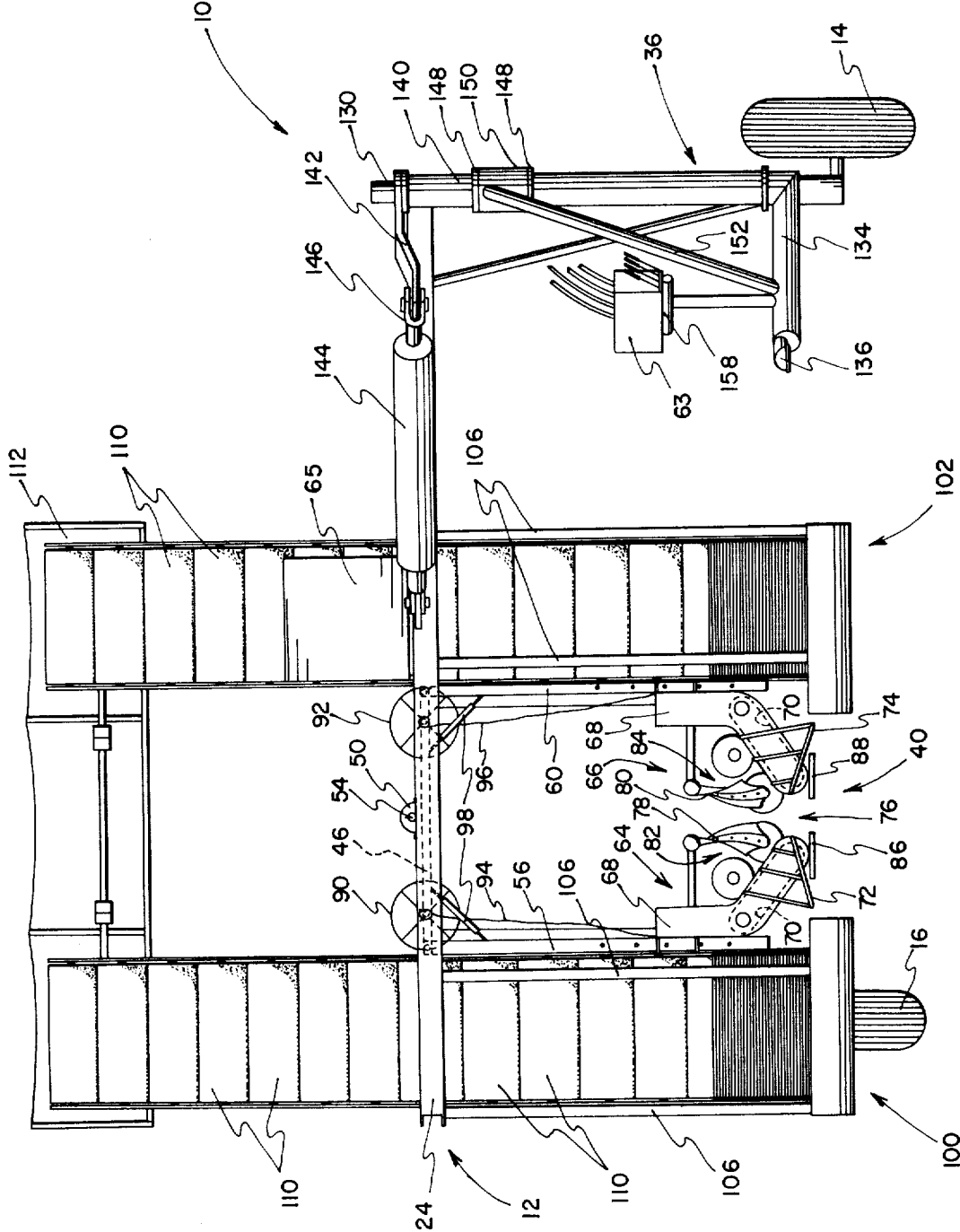
FIG. 2 is a front elevational view of the pull type automatic tobacco harvester of the present invention.

With further reference to the drawings, particularly FIGS. 1, 2 and 4, the pull type automatic tobacco harvester of the present invention is shown therein and indicated generally by the numeral 10. Viewing pull type harvester 10 in more detail, it is seen that the same includes a mobile main frame, indicated generally by the numeral 12, the main frame being supported about the rear by a left-hand wheel 14, and a pair of longitudinally aligned right-hand wheels 16 and 18.

Main frame 12 is basically of a rectangular design and includes a pair of longitudinally extending side members 20 and 22 interconnected by a main front transverse member 24, an intermediate transverse member 26, and a rear transverse structural member or assembly 28.

Left wheel 14 is rotatively mounted about the lower end of a left wheel support assembly 30 that extends downwardly from the left rear corner of main frame 12, while right rear wheels 16 and 18 are rotatively mounted on a longitudinal wheel support member 34 that is connected of its rear end to a vertical wheel support assembly 32 that extends downwardly from the right-hand rear corner of main frame 12.

Disposed about the left-hand front portion of main frame 12 is a swinging tongue assembly, indicated generally by the numeral 36, that is adapted to be connected to the draw bar of a conventional farm tractor 38, the tractor serving to pull harvester 10 through the field and to power the various working components thereof during the tobacco harvesting operation. A more detailed discussion of the swinging tongue assembly and its relationship to the main frame 12 of the harvester 10, and to the tractor 38 will be dealt with in detail in subsequent portions of the present disclosure.

In the way of general information and background, it should be pointed out that fully automatic tobacco harvesters of the type commercially available basically include a defoliator assembly for defoliating tobacco leaves from respective tobacco stalks and conveying them outwardly from the defoliator assembly to where the leaves are dropped or transferred onto a longitudinal conveyor assembly disposed on a respective side of the defoliator assembly. Once conveyed to the longitudinal conveyor assembly, the tobacco leaves are conveyed generally rearwardly and upwardly to where they are discharged into a trailer or a container that is usually supported, in the case of a high clearance self-propelled harvester, above the top of the tobacco stalks being traversed by the harvester. For a detailed appreciation of the basic components of an automatic tobacco harvester and for a unified understanding of the basic working components thereof such as the defoliator assembly, longitudinal conveyors and all other conveying means, rear fork lift, etc., one is referred to U.S. Pat. No. 3,841,071 to Jesse R. Pinkham et al (hereafter referred to as Pinkman et al), the complete contents and disclosure thereof being expressly incorporated herein by reference.

Although a detailed discussion of the well known components of an automatic tobacco harvester will not be dealt with herein in great detail, a general discussion will be presented for the sake of appreciating the basic principles and manner of operation of these components as used in the pull type automatic tobacco harvester 10 of the present invention. In this regard, it is seen that main frame 12 supports a defoliator assembly, indicated generally by the numeral 40, about the front portion thereof. Defoliator assembly 40 includes a defoliator frame structure having a top rectangular frame comprised of a pair of rotatable longitudinal side members 42 and 44 interconnected by front and rear cross members 46 and 48, respectively. Further structural support is provided by diagonal members 50 and 52 secured at the respective corners of the top rectangular frame comprising members 42, 44, 46 and 48.

Front and rear cross members of the defoliator frame include bearing assemblies 50 and 52, respectively, that are rotatively journaled around a main longitudinal defoliator assembly support shaft 54 that is fixed to the front and intermediate transverse members 24 and 26 of main frame 12, shaft 54 being welded to such members or secured by other suitable means. It is, therefore, appreciated that the top rectangular frame of the defoliator assembly can pivot about the longitudinal axis of shaft 54. Pivotably mounted about each of the four corners of the top defoliator frame just referred to is a series of support legs 56 and 60, the support legs on the right side being referred to by numeral 56 while those on the left side being referred to by the numeral 60. Support legs 56 and 60 can be adjusted at certain angles with respect to the rectangular top frame of the defoliator assembly 40 by the turn buckles 98 that are secured diagonally between each respective leg 56 or 60 and either the front or rear cross members 46 and 48 of the defoliator frame.

Right side support legs 56 and left side support legs 60 support right and left side defoliator mechanisms 64 and 66, respectively. Reviewing the structure of the defoliator mechanisms 64 and 66, it is seen that each of the support legs 56 and 60 support a main defoliator support plate 68. Disposed between respective front and rear support plates 68 is a steel link lateral conveyor assembly 70 that is driven such that the left conveyor assembly, as viewed in FIG. 2, is driven counterclockwise, while the right conveyor assembly 70, as viewed in FIG. 2, is driven clockwise. These conveyor assemblies 70 act to convey the defoliated tobacco leaves away from the defoliator assembly 40.

Continuing to review the basic structure of the defoliator assembly 40, it is seen that each side of the defoliator assembly is provided with a ground belt drive or stalk gripping belt 86 or 88, and wherein the area generally between the right and left side defoliator mechanisms defines a row passing area 76.

Rotatively driven within the defoliator assembly 40 is a pair of laterally spaced defoliators 78 and 80 disposed in conventional fashion; and driven therewith in a rearward position with respect to the defoliators is a pair of right and left-hand gleaner assemblies 82 and 84, as is commercially used today in automatic tobacco harvesters.

Extending forwardly from the defoliator assembly is a pair of row inlet guides 72 and 74 which are designed to generally urge and converge the stalks of the row being harvested into the defoliator assembly 40 and through the defined row passing area 76.

To adjust the height of the defoliator assembly 40, longitudinal side members 42 and 44 are provided with height adjustment wheels 90 and 92 that are operative to rotate longitudinal side members 42 and 44 so as to wind or unwind cable assemblies 94 and 96 that are connected to respective plates 68 of the defoliator assembly. Each plate 68 includes bracket means that generally surround a portion of respective support legs 56 and 60, such that when adjusting the height of the defoliator assembly 40, the respective plates 68 are constrained to move generally in alignment with the support legs 56 and 60.

Although not shown in detail, it should be noted that the defoliators 78 and 80, gleaner assemblies 82 and 84, steel link conveyor assemblies 70, and stalk gripping belts 86 and 88, are hydraulically driven in conventional fashion by one or more hydraulic motors driven by a hydraulic pump 58 that is in turn driven from the tractor's PTO through a PTO drive shaft 62, as illustrated in FIG. 1. While discussing the hydraulic drive, it should also be pointed out that the various hydraulic motors utilized to power the working components of the harvester 10 are controlled by a compound hydraulic control valve assembly 63, stationed as shown in FIG. 1, where the driver of the tractor can operate the same during the tobacco harvesting operation. Also, it is noted that mounted on main frame 12 is a hydraulic fluid reservoir 65 for containing the working hydraulic fluid circulated to the various hydraulic motors by the hydraulic pump 58.

Disposed on right and left sides of the defoliator assembly 40 is a pair of longitudinal main conveyor assemblies indicated generally by the numerals 100 and 102. Because both conveyor assemblies are virtually identical in construction and function, and are in fact of the type commonly utilized, a brief discussion will deal with only the construction and function of a single conveyor assembly with it being understood that the same would apply to both. In this regard, it is seen that each conveyor assembly 100 or 102 includes a main conveyor assembly frame structure 104 that is supported about the front of main frame 12 by front support posts 106 that are fixed to main frame 12 and depend downwardly therefrom. Conveyor assembly main frame structure 104 extends generally rearwardly from the front of harveser 10 to an intermediate point where the same generally curves upwardly and slightly rearwardly as viewed in FIG. 1. Housed within the conveyor assembly main frame structure 104 is an endless steel link conveyor 108 that extends from the front of the conveyor assembly main frame 104 to the upper rear terminal end thereof and is driven by a hydraulic motor such that the upper run of the steel link conveyor moves the tobacco leaves received from the defoliator assembly 40 rearwardly and upwardly to where the leaves exit the terminal end of the respective conveyor assembly 100 or 102 and drop into a trailer 114 supported by a vertically adjustable fork lift assembly indicated generally by the numeral 116 (see Pinkham et al). Although not particularly shown in complete detail, it is appreciated that the lower run of the steel link conveyor would return and extend from the upper rear terminal end of the conveyor assembly to the front end, which terminates at about the same general location as the front of the defoliator assembly 40.

Each longitudinal conveyor assembly 100 or 102 is provided with a series of rollers 110 rotatively mounted transversely across the upper run of the steel link conveyor 108 about that portion of the conveyor assembly where the tobacco leaves begin the upward and slightly rearward elevated run. The presence of the rollers 110 gives the conveying assembly a positive conveying characteristic as the tobacco leaves are generally maintained between the upper run of the steel link conveyor assembly 108 and the respective rollers 110.

Figure 5:
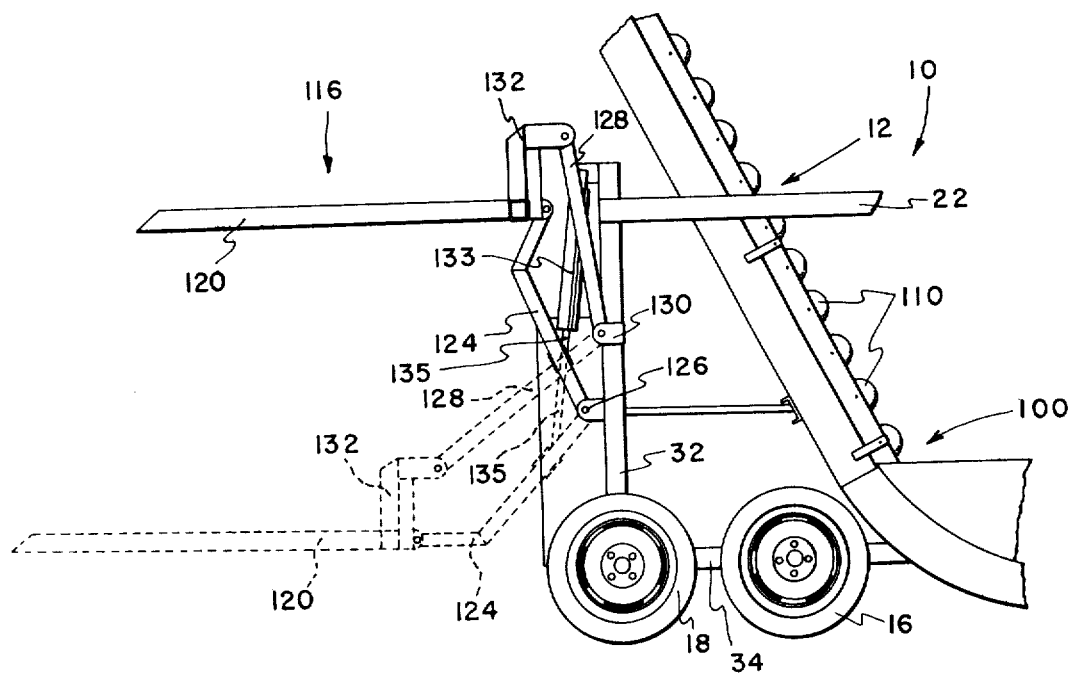
FIG. 5 is a rear fragmentary side elevational view of the pull type automatic tobacco harvester of the present invention.
Figure 6:
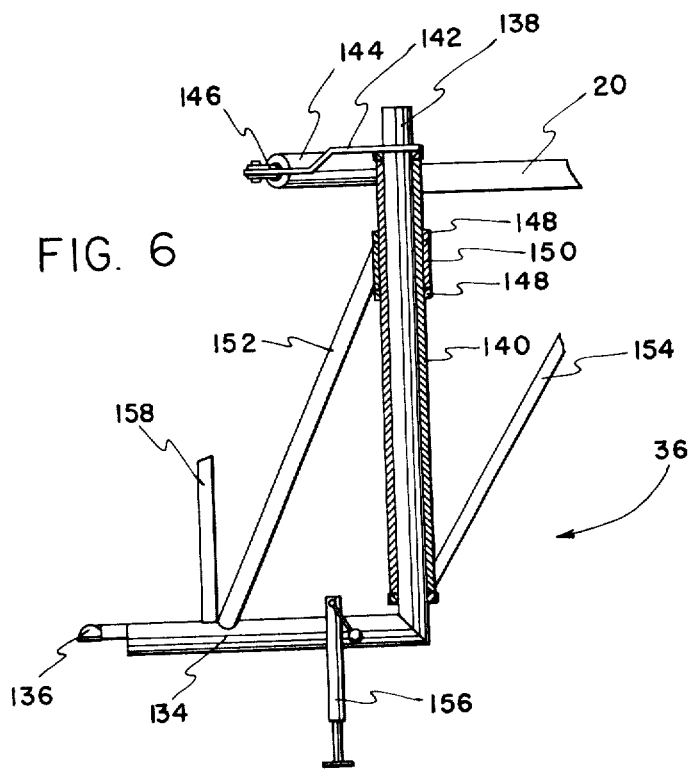
FIG. 6 is a fragmentary, partially sectional, side elevational view of the pivoting tongue and support assembly of the harvester.

Turning to a discussion of the hydraulically actuated fork lift assembly 116, as best seen in FIGS. 4 and 5, it is seen that the fork lift assembly 116 includes a pair of laterally spaced rearwardly extending arms 118 and 120 that are adapted to engage the bottom of trailer 114 to support the latter. Extending across the rear portions of arms 118 and 120 is a back transverse member or assembly 122. Pivotally connected to the back side of the fork lift assembly 116 is a pair of laterally spaced corresponding lift arms 124, each lift arm extending generall downwardly from the fork lift assembly where a lower rearward portion thereof, as viewed in full lines in FIG. 5, is pivotably connected to a respective arm support member 126 that is fixed to main frame 12 by weldment or other suitable means and extends rearwardly therefrom. Lift arms 124 are actuated and driven by hydraulic cylinder means 134, preferably in the form of a pair of hydraulic cylinders anchored to main frame 12 and extending generally downwardly therefrom where the rod ends 132 thereof are pivotably connected to respective lift arms 124. The hydraulic cylinder means 134, just referred to, can be controlled by the compound control valve 63 referred to above and shown particularly in FIG. 1. To maintain arms 118 and 120 of the fork lift assembly 116 in a generally horizontal position at all times, there is provided a pair of holding arms 128 that are pivotably connected to arm support means 130 fixed to main frame 12 and extending therefrom. As viewed in the elevated position (full lines in FIG. 5), the holding arms 128 are pivotably connected to a connecting assembly 132 secured to the fork lift assembly 116 and extending generally upwardly and rearwardly therefrom. Therefore, it is seen that by actuating hydraulic cylinder means 134 that the trailer 114 can be raised and lowered between a ground engaged position and a position underneath a shroud 112 extending rearwardly from the rear terminal ends of the longitudinal conveyor assemblies 100 and 102.

Turning to the swinging tongue assembly, indicated generally by the numeral 36, it is seen that harvester 10 includes a tongue 134 provided with a draw bar hitch point 136 about the front end thereof. Extending upwardly about the rear horizontal portion of the tongue 134 is a vertical tongue extension shaft 138 that is rotatively journaled in a stationary sleeve or cylinder 140 that forms a part of the harvester main frame 12 and is located, in the preferred embodiment shown herein, about the left-hand front corner of the harvester's main frame. A top portion of tongue extension shaft 138 extends outwardly from sleeve 140 where a radius arm 142 is fixed thereto and extends radially therefrom. Operatively interconnected between main frame 12 and radius arm 142 is a hydraulic cylinder 144, the hydraulic cylinder 144 being anchored to front transverse member 24 of main frame 12 and extending therefrom where the rod end 146 thereof is connected to the outer portion of the radius arm 142.

Intermediately formed about stationary sleeve or cylinder 140 is a pair of vertically spaced annular collars 148 that are welded or otherwise secured to the sleeve or cylinder 140 so as to support and confine a brace sleeve 150 rotatively journaled around the stationary sleeve or cylinder 140. Welded to brace sleeve 150 or secured thereto by other suitable means is a diagonal brace 152 that extends generally downwardly to where the rearmost end is connected to tongue 134. Further bracing is provided by a side diagonal brace 154 that is connected to and extends between sleeve 140 and longitudinal side members 120 of main frame 12, as best seen in FIG. 5. A further brace may be provided between sleeve 140 and front transverse member 24. To support the tongue 134 when disconnected from a tractor, there is provided an adjustable jack 156 that is secured to the tongue and is operative to fold to a transport position when the tongue is connected to the draw bar of a tractor. Also, tongue 134 is provided with a valve support stand 158 that is fixed thereto and extends generally upwardly to where the compound control valve 63 is supported thereon in close proximity to the operator's station on the tractor, such that the operator during tobacco harvesting can control the various working components of harvester 10 and hydraulic cylinder 144 from the tractor.

Turning now to a discussion of the operation of the pull type harvester 10 and the method of harvesting tabacco as contemplated and disclosed herein, it should be pointed out that harvester 10 is particularly adapted to operate in fields planted with every fifth row being a skip row SR, and the rows running adjacent thereto being referred to as outside rows OR, and the respective rows inwardly thereof being referred to as inside rows IR, as shown in FIGS. 7 and 8. To harvest the outside rows OR, the hydraulic cylinder 144 is actuated such that it assumes a retracted position such that tongue 134 is swung to a position defining an acute angle between the tongue 134 and the front transverse member 24 of the main frame 12. This is referred to as a first harvesting position and as particularly illustrated in FIG. 7 the pull type harvester in this position is positioned in a trailing position with respect to tractor 38 such that the defoliator assembly 40 aligns with an outside row OR. In the case of the present design, the harvester 10 will be harvesting on the right-hand side of the tractor as it moves forwardly through the field. It is seen that in this first position harvesting an outside row OR as seen in FIG. 7, the hydraulic cylinder 144 is in a retracted position. This generally dictates that according to the present invention and design that the harvester 10 trails the tractor 38 such that the defoliator assembly aligns with a respective outside row OR and wherein left rear wheel 14 is disposed in the skip row and right rear wheels 16 and 18 are disposed between respective outside and inside rows OR and IR. It follows that in the case indicated in FIGS. 7 and 8 that both outside rows OR flanking the skip row SR can be harvested by moving up and down the same skip row SR.

To harvest respective inside rows IR in a planting scheme such as illustrated in FIGS. 7 and 8, the trailing position of the harvester 10 with respect to the tractor 38 is varied such that the main frame 12 is laterally adjusted to a second outer position, more to the right of the tractor 38 as viewed in FIGS. 7 and 8 and in dotted lines in FIG. 4. To accomplish this, the hydraulic cylinder 144 is actuated such that the rod end 146 is extended. Because the tractor 38 remains stationary and the tongue 134 is pivotably mounted to the tractor's draw bar, it follows that the extension of the rod end of the hydraulic cylinder 144 causes the main frame 12 of the harvester to shift laterally to the right of the tractor, as viewed in FIG. 8. Basically, the extension of the hydraulic cylinder 144 causes the vertical tongue extension shaft 138 to be rotated counterclockwise as viewed in FIGS. 4, 7 and 8. This counterclockwise movement causes the tongue 134 to be shifted from a first position (FIG. 7) to a second position (FIG. 8). Generally, when the hydraulic cylinder 144 is extended, the tongue 134 and front transverse member 24 of main frame 12 forms an obtuse angle. It is appreciated that as the tongue 134 swings from the first position, FIG. 7, to the second position, FIG. 8, that the main frame 12 of the harvester is generally constrained to move to the right as viewed in FIG. 8. This is usually done at the end of the rows and while the tractor is traveling. But even if done when stationary, once the tractor 38 begins to move the main frame 12 will assume a trailing position wherein the longitudinal axis of the main frame will be generally parallel with the direction of travel of the tractor 38. In the second position, as shown in FIG. 8, it is seen that the left side of the main frame is designed such that a row passing area RPA (FIG. 2) is defined between the left longitudinal conveyor assembly 102 and the left side of the main frame 12. This allows the adjacent outside row OR to pass through the harvester 10 without engaging and damaging that row of tobacco stalks.

It should be pointed out that in operation, especially when harvesting the inside row IR, that the operator of the tractor can continue to control the hydraulic cylinder 144 from the tractor so as to maintain the defoliator assembly 40 in as close alignment with the inside row IR being harvested as possible. In certain cases, precise alignment might not be maintained, in which case the fact that the defoliator assembly 40 can pivot about the longitudinal axis of shaft 54 tends to give rise to a self-aligning feature of the tobacco harvester 10.

It is common practice to space rows 48 inches apart. Thus it is necessary that the stroke of hydraulic cylinder 144 gives rise to at least a 48-inch lateral shift in the harvester's trailing position in order to harvest outside and inside rows. In such case, to provide for variations in row spacing and to give the operator full opportunity to control the trailing position of the harvester during operation it is recommended that the geometry of the swinging tongue assembly be designed to provide a lateral shift greater than the row spacing, such as 54 inches with 48-inch spaced rows. Also it is recommended that in moving between the first and second positions (FIGS. 7 and 8) the tongue 134 should preferably move through equal angles on each side of a longitudinal axis extending through the axis of shaft 138 and directed in the direction of travel.

The terms "upper", "lower", "forward", "rearward", etc., have been used herein merely for the convenience of the foregoing specification and in the appended Claims to describe the pull type automatic tobacco harvester and its parts as oriented in the drawings. It is to be understood, however, that these terms are in no way limiting to the invention since the pull type automatic tobacco harvester may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A method of harvesting tobacco in a field having a plurality of laterally spaced rows throughout the field with at least one skip row provided at intervals within the field for allowing a tractor to pass therethrough, wherein said method of harvesting tobacco utilizes a pull type automatic harvester having a main frame having ground engaging means mounted thereto for supporting said main frame and allowing the same to move on the ground during the harvesting operation, said ground engaging main frame being connected to a tractor that is adapted to move through respective skip rows within the field and to pull said ground engaging main frame of the harvester therebehind through the field during the tobacco harvesting operation, said method comprising the steps of: positioning the ground engaging main frame of said harvester in a first position relative to said tractor where a defoliator assembly carried thereby aligns with a first row of tobacco; pulling said ground engaging main frame of the harvester through the field such that the defoliator assembly carried thereby comes into operative engagement with stalks of said first row for defoliating leaves therefrom for harvesting said first row during the harvesting operation; simultaneously moving said ground engaging main frame of said harvester together with said defoliator assembly laterally over the ground with respect to said tractor to a second position where the defoliator assembly carried by said ground engaging main frame aligns with a second row laterally spaced from said first row, whereby said first and second laterally spaced rows may be harvested with the tractor occupying the same skip row while the harvester is positioned in said first or second position for harvesting said first and second rows, and pulling said ground engaging main frame of the harvester through the field such that the defoliator assembly carried by said ground engaging main frame comes into operative engagement with stalks of said second row for defoliating leaves from the respective stalks thereof.

2. The method of claim 1 wherein the method of harvesting further includes slightly varying and adjusting the position of the ground engaging main frame of said harvester relative to said tractor, from time to time as the need arises, as the harvester is pulled along a respective row to more precisely align the defoliator assembly carried by said main frame with the particular tobacco row being harvested.

3. The method of claim 1 wherein the step of moving said ground engaging main frame between said first and second positions for harvesting said first or second rows includes the step of swinging an interconnected tongue pivotably connected about a vertical axis about the front of said harvester main frame from a first position to a second position, such that the main frame of said harvester is forced to assume first and second laterally spaced positions relative to said tractor since the tractor remains relatively stationary with respect to said first and second laterally spaced positions of said harvester main frame.

4. A method of harvesting tobacco with a pull type automatic tobacco harvester having a main frame, including ground engaging wheels for allowing the same to move over the ground during the harvesting operation, operatively connected to a tractor in a tobacco field wherein throughout the field a series of tractor passing areas is provided with each tractor passing area being flanked on each side by two or more rows, the rows running directly adjacent the tractor passing area being referred to as outside rows and each row adjacent and outwardly of said outside row on the opposite side of said tractor passing area being referred to as an inside row, the method of harvesting outside and inside rows flanking a particular tractor passing area comprising: positioning the ground engaging main frame of said harvester such that said main frame assumes a first outside row harvesting position with respect to said tractor, such that when said tractor occupies a particular tractor passing area and moves in a first direction therealong said harvester main frame is positioned such that a defoliator assembly carried thereby aligns with one of said outside rows, and wherein said harvester and defoliating assembly in said first outside row harvesting position aligns with the other outside row when said tractor occupies the same tractor passing area and is directed therein in a direction opposite said first direction; harvesting at least one outside row with said harvester's ground engaging main frame positioned with respect to said tractor in said first outside row harvesting position; moving said harvester's ground engaging main frame from said first outside row harvesting position to a second inside row harvesting position wherein in said second inside row harvesting position said harvester's ground engaging main frame assumes a position laterally spaced outwardly from the position thereof when in said first outside row harvesting position, such that when said tractor occupies said particular tractor passing area and moves in a first direction therealong said harvester's ground engaging main frame is positioned such that the defoliator assembly carried thereby aligns with one of said inside rows, and wherein said harvester and defoliating assembly in said second inside row harvesting position aligns with said other inside row when said tractor occupies the same tractor passing area and is directed therein in a direction opposite said first direction; and harvesting at least one inside row with said harvester main frame being positioned in said second inside row position, after which said harvester main frame can be moved back and forth between said first position and said second position for harvesting respective outside and inside rows throughout the field during the harvesting operation.

5. The method of claim 4 wherein said harvester's ground engaging main frame is moved between said first outside row harvesting position and said second inside row harvesting position by swinging a tongue normally interconnected between said tractor and said main frame about a vertical axis generally about one front side of said harvester main frame, said tongue being swung about said axis by actuating a hydraulic cylinder operatively connected between said tongue and said main frame such that said tongue may be moved back and forth about said vertical axis between a first position where said harvester main frame is disposed in said first outside row harvesting position and a second position where said harvester main frame is disposed in a second inside row harvesting position.

6. A method of harvesting tobacco in a field having a plurality of laterally spaced rows throughout the field with at least one skip row provided at intervals within the field for allowing a tractor to pass therethrough, wherein said method of harvesting tobacco utilizes a pull type automatic tobacco harvester having a ground engaging wheel means mounted thereto for supporting said main frame and allowing the same to move over the ground during the harvesting operation, said ground engaging main frame being connected to a tractor that is adapted to move through respective skip rows within the field and to pull said harvester therebehind through the field during the tobacco harvesting operation, said method comprising the steps of: positioning the ground engaging main frame of said harvester in a first position relative to said tractor where a defoliator assembly carried thereby aligns with a first row of tobacco; pulling said ground engaging main frame of said harvester through the field such that the defoliator assembly carried thereby comes into operative engagement with stalks of said first row for defoliating leaves therefrom for harvesting said first row during the harvesting operation; moving said ground engaging main frame of said harvester, together with said defoliator assembly, laterally over the ground with respect to said tractor to a second position laterally spaced from said first position for slightly varying and adjusting the position of the ground engaging main frame of said harvester relative to said tractor, from time to time as the need arises, as the ground engaging main frame of the harvester is pulled along a respective row to more precisely align the defoliator assembly carried by said main frame with the particular tobacco row being harvested.

7. The method of claim 6 including the step of fixing said defoliator assembly about at least one point to said ground engaging main frame; and maintaining said defoliator assembly fixed about said point throughout the entire tobacco harvesting operation such that the defoliator assembly in its totality is prohibited from moving in a rectilinear fashion from side-to-side about said ground engaging main frame.

8. The method of claim 7 further including the step of rotatively mounting in said defoliator assembly about a longitudinal axis on said ground engaging main frame; and maintaining said longitudinal axis about which said defoliator assembly is rotatively mounted stationary with respect to said ground engaging main frame throughout the entire tobacco harvesting operation such that said longitudinal axis is prohibited from moving laterally side-to-side during any part of the tobacco harvesting operation.

* * * * *